(12) United States Patent
Huang et al.

(10) Patent No.: US 10,849,002 B2
(45) Date of Patent: Nov. 24, 2020

(54) LICENSE ASSISTED ACCESS MEASUREMENT

(71) Applicant: Intel IP Corporation, Santa Clara, CA (US)

(72) Inventors: Rui Huang, Beijing (CN); Yang Tang, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/081,148

(22) PCT Filed: Aug. 30, 2016

(86) PCT No.: PCT/US2016/049430
§ 371 (c)(1),
(2) Date: Aug. 30, 2018

(87) PCT Pub. No.: WO2017/171913
PCT Pub. Date: Oct. 5, 2017

(65) Prior Publication Data
US 2019/0075479 A1    Mar. 7, 2019

Related U.S. Application Data

(60) Provisional application No. 62/316,830, filed on Apr. 1, 2016, provisional application No. 62/317,262, filed on Apr. 1, 2016.

(51) Int. Cl.
*H04W 24/10* (2009.01)
*H04L 5/00* (2006.01)
(Continued)

(52) U.S. Cl.
CPC .......... *H04W 24/10* (2013.01); *H04B 17/336* (2015.01); *H04L 5/005* (2013.01);
(Continued)

(58) Field of Classification Search
CPC ....... H04B 17/24; H04B 17/336; H04L 5/005; H04L 5/0053; H04L 5/0091; H04W 16/14;
(Continued)

(56) References Cited

U.S. PATENT DOCUMENTS

2016/0095048 A1    3/2016  Nory et al.
2016/0135148 A1*   5/2016  Novlan ..................... H04L 1/00
                                                                370/329
2018/0368142 A1*  12/2018  Liou .................. H04W 72/0446

FOREIGN PATENT DOCUMENTS

WO    WO-2016186323 A1 * 11/2016  ............ H04W 24/08

OTHER PUBLICATIONS

International Search Report dated Dec. 13, 2016 for International Application PCT/US2016/049430.
(Continued)

*Primary Examiner* — Omar J Ghowrwal
*Assistant Examiner* — Kokou R Detse
(74) *Attorney, Agent, or Firm* — Schwabe, Williamson & Wyatt, P.C.

(57) ABSTRACT

An arrangement configured to be employed within a user equipment (UE). The arrangement includes control circuitry. The control circuitry is configured to obtain a measurement configuration, where the measurement configuration complies with license assisted access (LAA) and includes a measurement window; obtain one or more discovery reference signals (DRS) from an evolved Node B (eNodeB) during the measurement window; determine SINR estimates based on the one or more DRS, compare the SINR estimates to a threshold; generate a target cell measurement based on the one or more DRS, the SINR estimates and the measurement configuration; and generate a measurement report that includes the target cell measurement.

22 Claims, 9 Drawing Sheets

(51) Int. Cl.
H04W 16/14 (2009.01)
H04B 17/336 (2015.01)
H04W 48/20 (2009.01)
H04W 74/08 (2009.01)
H04B 17/24 (2015.01)
H04W 74/00 (2009.01)
H04W 24/02 (2009.01)
H04W 48/12 (2009.01)
H04W 48/16 (2009.01)

(52) U.S. Cl.
CPC .......... H04L 5/0053 (2013.01); H04L 5/0091 (2013.01); H04W 16/14 (2013.01); H04W 48/20 (2013.01); H04W 74/0808 (2013.01); H04B 17/24 (2015.01); H04W 24/02 (2013.01); H04W 48/12 (2013.01); H04W 48/16 (2013.01); H04W 74/006 (2013.01)

(58) Field of Classification Search
CPC ..... H04W 24/02; H04W 24/10; H04W 48/12; H04W 48/16; H04W 48/20; H04W 74/006; H04W 74/0808
USPC ........................................................ 370/329
See application file for complete search history.

(56) References Cited

OTHER PUBLICATIONS

"Discussion on measurement accuracy requirements of LAA." Source: Intel Corporation. Agenda Item: 6.13.3. 3GPP TSG-RAN WG4 Meeting #78, St. Julian's, Malta, Feb. 15-19, 2016. R4-160141. 4 pages.
"Discussion on UE RRM measurement/reporting for LAA." Source: NEC. Agenda Item: 7.2.4.2.2. 3GPP TSG-RAN WG1 Meeting #82, Beijing, China, Aug. 24-28, 2015. R1-154206. 2 pages.
"Leftover UE capabilities for LAA." Source: Ericsson. 3GPP TSG-RAN WG2 Meeting #93, Malta, Feb. 15-19, 2016. R2-161823. 4 pages.
Kwon, Hwan-Joon et al. "Licensed-Assisted Access to Unlicensed Spectrum in LTE Release 13." IEEE Communications Magazine on LTE Evolution on Apr. 25, 2016 (initially submitted on Nov. 30, 2015). 10 pages.
"3rd Generation Partnership Project; Technical Specification Group Radio Access Network; Evolved Universal Terrestrial Radio Access (E-UTRA); Requirements for support of radio resource management (Release 13)." 3GPP TS 36.133 V13.2.0 (Jan. 2016). Lte Advanced Pro. 45 pages.
"3rd Generation Partnership Project; Technical Specification Group Radio Access Network; Evolved Universal Terrestrial Radio Access (E-UTRA); Requirements for support of radio resource management (Release 13)." 3GPP TS 36.133 V13.2.0 (Jan. 2016). Lte Advanced Pro. 266 pages.
"3rd Generation Partnership Project; Technical Specification Group Radio Access Network; Evolved Universal Terrestrial Radio Access (E-UTRA); Requirements for support of radio resource management (Release 13)." 3GPP TS 36.133 V13.2.0 (Jan. 2016). Lte Advanced Pro. 256 pages.
"3rd Generation Partnership Project; Technical Specification Group Radio Access Network; Evolved Universal Terrestrial Radio Access (E-UTRA); Requirements for support of radio resource management (Release 13)." 3GPP TS 36.133 V13.2.0 (Jan. 2016). Lte Advanced Pro. 315 pages.
"3rd Generation Partnership Project; Technical Specification Group Radio Access Network; Evolved Universal Terrestrial Radio Access (E-UTRA); Requirements for support of radio resource management (Release 13)." 3GPP TS 36.133 V13.2.0 (Jan. 2016). Lte Advanced Pro. 320 pages.
"3rd Generation Partnership Project; Technical Specification Group Radio Access Network; Evolved Universal Terrestrial Radio Access (E-UTRA); Radio Resource Control (RRC); Protocol Specification (Release 13)." 3GPP TS 346.331 V13.0.0 (Dec. 2015). Lte Advanced Pro. 250 pages.
"3rd Generation Partnership Project; Technical Specification Group Radio Access Network; Evolved Universal Terrestrial Radio Access (E-UTRA); Radio Resource Control (RRC); Protocol Specification, (Release 13)." 3GPP TS 346.331 V13.0.0 (Dec. 2015). Lte Advanced Pro. 257 pages.
International Preliminary Report on Patentability dated Oct. 11, 2018 for International Application PCT/US2016/049430.

* cited by examiner

LICENSE ASSISTED ACCESS MEASUREMENT

REFERENCE TO RELATED APPLICATION

This application is a National Phase entry application of International Patent Application No. PCT/US2016/049430 filed Aug. 30, 2016, which claims priority to U.S. Provisional Application 62/316,830 filed on Apr. 1, 2016, entitled "ONE METHOD OF MEASUREMENT WITH SINR THRESHOLD IN LAA" and U.S. Provisional Application 62/317,262 filed on Apr. 1, 2016, entitled "LAA MEASUREMENT IN LOW SINR" in the name of Rui Huang et al. and is hereby incorporated by reference in its entirety.

FIELD

The present disclosure relates to mobile communication, including license assisted access measurement and threshold selection for mobile communication.

BACKGROUND

Mobile communications, including cellular communications, involve the transfer of data or information. Various bandwidths or bands of a spectrum are used for communication. These bands can be licensed or otherwise allocated for communication between mobile devices and base stations.

Typically, bands are allocated for use by only specific or authorized devices. This allocation, referred to as licensing, attempts to prevent issues such as cross talk, interference, noise and the like from degrading mobile communications. Only authorized devices can use the band, so the channels or bands are clear for communication.

However, portions of the spectrum or bands can remain unused for various reasons. For example, It could be that a licensee is not operating at the time and using a licensed spectrum. It could also be that the band is reserved for a purpose, but is not needed. As a result, large amounts of available spectrum can go unused. This lack of use of available spectrum degrades mobile communications.

DETAILED DESCRIPTION

Figure 1:
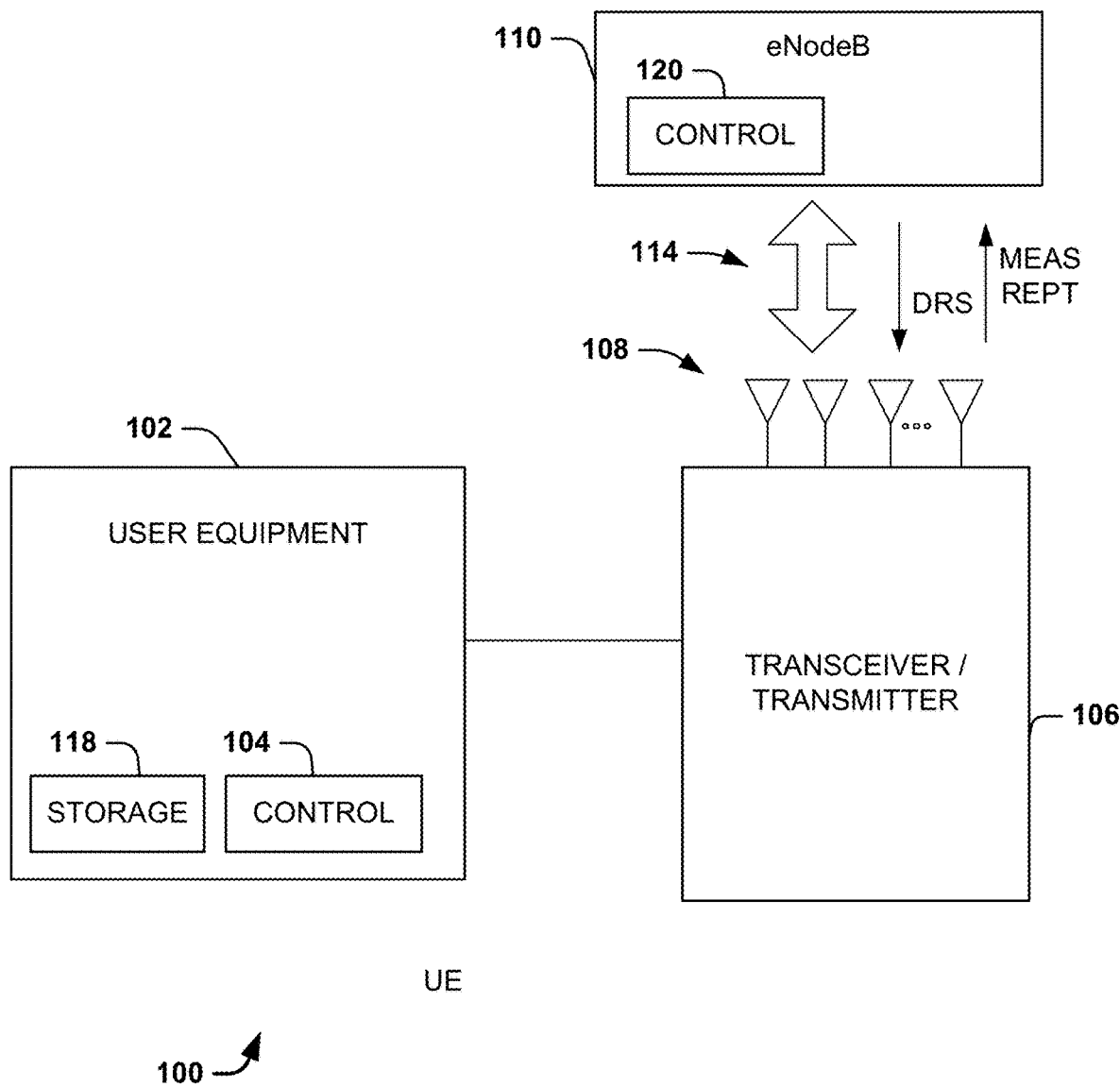
FIG. 1 is a diagram illustrating an arrangement for communications using unlicensed bands under LAA.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC, an electronic circuit and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The radio frequency (RF) spectrum generally covers a frequency range from 3 kHz to 300 GHz. The RF spectrum can be used for mobile communications between mobile devices, including user equipment (UE) and base stations, including evolved Node B (eNodeB). Various portions of the RF spectrum is licensed for use via various mechanisms including auctions, lotteries and the like. Once licensed, that portion of the spectrum, also referred to as a band, is restricted for use by only the licensee.

Unlicensed portions of the RF spectrum also exist. These portions of the spectrum may be populated by various devices using varied communication techniques.

Typically, these bands are used for short range radio transmissions. These bands include Industrial, Scientific and Medical (ISM) bands and are allocated in different parts of the spectrum for a wide variety of applications including microwave ovens, Wi-Fi™, Bluetooth™ and the like.

An example ISM band is a 5 GHz band is utilized by Wi-Fi and Wi-Fi devices. Wi-Fi devices, such as smartphones, laptops, tablets and the like utilize Wi-Fi for connecting to home networks, broadband services, hotspots and the like.

Mobile communications, including mobile communications using the Long Term Evolution (LTE) standard can utilize the unlicensed portions or bands, such as Wi-Fi. For example, LTE in the unlicensed spectrum (LTE-U) and License Assisted Access (LAA) are technologies that utilize the unlicensed 5 GHz band used by the Wi-Fi devices. Using the unlicensed portions can, for example, be used to improve data speeds over short distances without logging in or connecting to a separate network or Wi-Fi network.

One condition to use ISM bands, such as the 5 GHz bands, for access to these frequencies can be that they coexist with other users of the band. Generally, a check such as using Clear Channel Assessment (CCA) or Listen Before Talk (LBT) is used to determine if a band is available for use. If a requested band is unavailable, another band can be used.

If a band is available, one or more measurements of a cell within the requested band are made to determine is the cell can be used.

Various embodiments are disclosed that facilitate the use of unlicensed bands for mobile communication, including LAA. The embodiments include measuring and reporting measurements for a cell.

FIG. 1 is a diagram illustrating an arrangement 100 for communications using unlicensed bands under LAA. The communications include uplink (UL) communications and downlink (DL) communications. The arrangement 100 identifies unlicensed bands and cells for UL and/or DL communications.

The arrangement 100 includes a user equipment (UE) 102, a transceiver 106 and an evolved Node B (eNodeB) 110. The UE 102 includes its transceiver 106, a storage component 118, and a control circuitry 104. The storage component 118 includes a memory, storage element and the like and is configured to store information for the UE 102. The control circuitry 104 is configured to perform various operations associated with the UE 102. The control circuitry 104 can include logic, components, circuitry, one or more processors and the like. The transceiver 106 includes transmitter functionality and receiver functionality. The transceiver includes 106 one or more antenna 108 configured to send and receive signals from other devices. The UE 102 is configured to communicate with devices, such as the eNodeB 110.

The eNodeB 110 includes a transceiver, a storage component, and a control circuitry 120. The storage component includes a memory, storage element and the like and is configured to store information for the UE 102. The control circuitry 104 is configured to perform various operations associated with the eNodeB 110. The control circuitry 120 can include logic, components, circuitry, one or more processors and the like. The transceiver includes transmitter functionality and receiver functionality. The transceiver typically includes one or more antenna configured to send and receive signals from other devices.

A transmission or link 114 exists between the UE 102 and the eNodeB 110. The transmission 114 uses an unlicensed band, such as a 5 GHz unlicensed band used for Wi-Fi under LAA.

The eNodeB 110 is configured to determine, identify, and or opportunistically select an unlicensed band and cell for the transmission 114. The eNodeB 110 may select or selects a channel/band within an unlicensed portion of the RF spectrum that is substantially free or only slightly loaded. In one example, the selected band is one that does not have a network actively operating on it, such as a Wi-Fi network. Additionally, the selected band is generally not in use for a radar system or some other similar purpose. Furthermore, the selected band may comply with power specifications, such as a transmit power limit. The cell, in one example, can be a small cell.

The eNodeB 110 can use one or more suitable techniques for determining if an unlicensed band or medium is available. One technique that can be used is listen before talk (LBT) where a transmitter of the eNodeB 110 senses the unlicensed bandwidth or medium to determine if the target band is idle (available). Another technique that can be used is a clear channel assessment (CCA). Other suitable techniques can be used. If the target band is occupied, the transmission 114 can be delayed until it is free.

The eNodeB 110 is configured to provide target cell identification and other information related to the unlicensed band to the UE 102. The other information can include a measurement type (single shot or multi-shot), a measurement window and the like can be provided in a measurement configuration.

The control circuitry 104 of the UE 102 is configured to perform cell detection based on one or more discovery reference signals (DRS). The control circuitry 104 is also configured to generate a target cell measurement based on one or more DRS and provide the target measurement or indication back to the eNodeB 110 as part of a measurement report. In one example, the control circuitry 104 is part of or used in conjunction with radio frequency (RF) circuitry (not shown) for the UE 102. An example of RF circuitry is shown below with FIG. 9.

The eNodeB 110 is configured to generate the DRS. The DRS includes signals generally facilitate transition of a cell (small cell) from an OFF state to an ON state by transmitting low duty cycle signals for radio resource management (RRM) measurement during the OFF state. During this OFF state, the DRS are used to allow the UE 102 to measure and discover the target cell. The DRS are transmitted periodically according to a time window specified within a DRS measurement timing configuration. Some examples of the configurable time window include 40, 80, 160 mili-seconds and the like. The transmission of DRS is subject to look before talk (LBT). The eNodeB 110 can reserve the target cell for use by the UE 102 to prevent other devices from requesting use of the target cell. The DRS include signals that facilitate identifying resources, cell identification, determining path loss, and the like. The DRS include signals such as primary synchronization signals (PSS), secondary synchronization signals (SSS) and the like.

The UE 102 typically provides the target measurement within a measurement report. The measurement report can include other information including, but not limited to a measurement technique or type, number of DRS used and the like.

The target cell measurement can be performed using a single shot, which is a single DRS or a multi-shot, which is based on multiple DRS. The multi-shot utilizes a plurality of DRS over a period or window. In one example, the eNodeB 110 is preconfigured to indicate that the UE 102 use one of the single shot and the multi-shot. In another example, the eNodeB 110 is configured to allow the UE 102 to dynamically determine whether to use single shot or multi-shot.

The UE 102 compares the target measurement with a target threshold value. The threshold value is an acceptable noise or signal threshold. The target threshold value can be indicated by the eNodeB 110 and/or determined by the UE 102.

If the target measurement is below the threshold value, the UE 102 can report back to the eNodeB 110 that a multi-shot technique or additional DRS signals are needed and/or that the target measurement is below the threshold value. Additionally, the UE 102 can report that the target measurement is not feasible/acceptable due to the low target measurement. The UE 102 can continue detecting additional or following DRS.

For the multi-shot technique, the UE 102 is configured to receive and buffer a selected number of DRS. Then, the UE 102 determines the target measurement based on the buffered DRS. The UE 102 provides the target measurement based on the multi-shot type to the eNodeB 110 with the measurement report.

Figure 2:
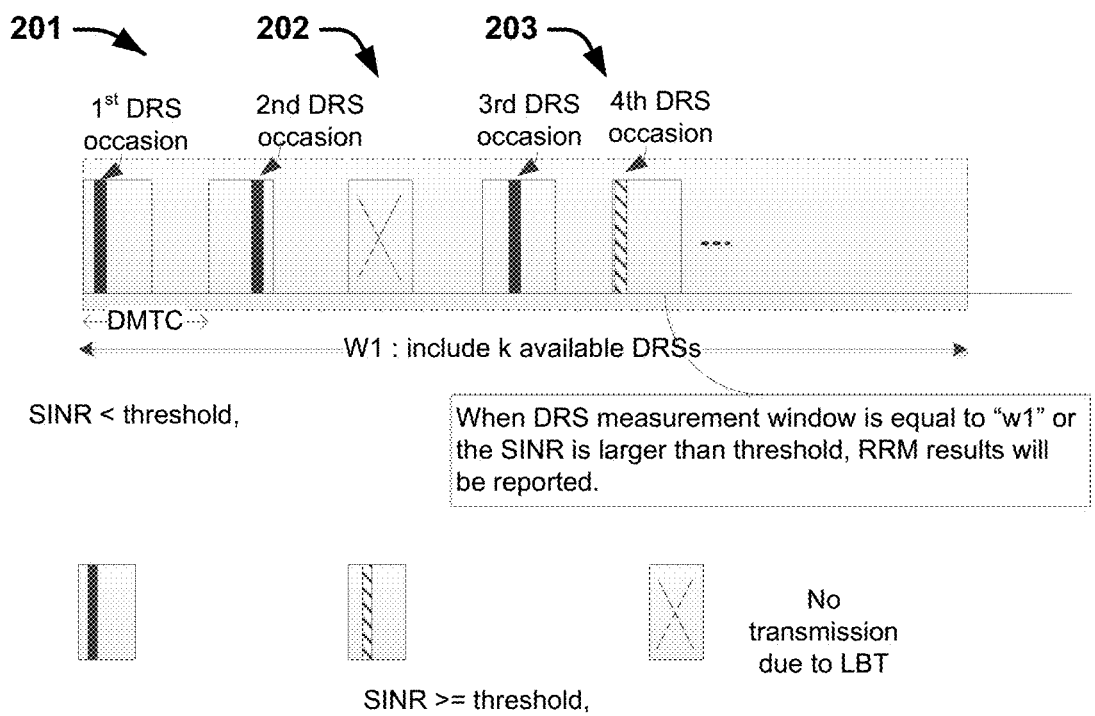
FIG. 2 is a diagram illustrating an example of obtaining a target cell measurement using a multi-shot window in accordance with an embodiment.

FIG. 2 is a diagram 200 illustrating an example of obtaining a target cell measurement using a multi-shot window in accordance with an embodiment. The example is provided to facilitate understanding and it is appreciated that suitable variations are contemplated. The diagram generally depicts time along an x-axis and values along a y-axis.

The DRS are generated by an eNodeB, such as the eNodeB 110, and received by a UE, such as the UE 102. In this example, a measurement window is specified as W1 and includes k available DRS. Each DRS occurs at an occasion specified in a DRS measurement timing configuration (DMTC). The length of the measurement window can be specified.

For each DRS occasion, the UE is configured to generate a target cell measurement based on the respective DRS, which in this example is a SINR. It is appreciated that other metrics/measurements can also be used. The target cell measurement is compared against a threshold. First and second occasions 201 show examples where the target cell measurement falls below a threshold value. A period of no transmission 202 is shown next, where no transmission occurred due to LBT. A third occasion illustrates another measurement that falls below the threshold value.

A fourth occasion 203 shows a DRS that results in a target cell measurement that exceeds the threshold value. The target cell measurement, along with measurements for the other occasions, can be reported as radio resource management (RRM) results.

If the fourth occasion 203 did not have a measurement that exceeded the threshold value, additional measurements could be taken during the window w1 until the time for the window expired. Thus, in this example, the target cell measurement(s) and the like are reported after a measurement exceeds the threshold or after the window w1 expires.

If the target measurement is suitable, the eNodeB allows/assigns the UE to use the target cell for communications on an unlicensed band.

Figure 3:
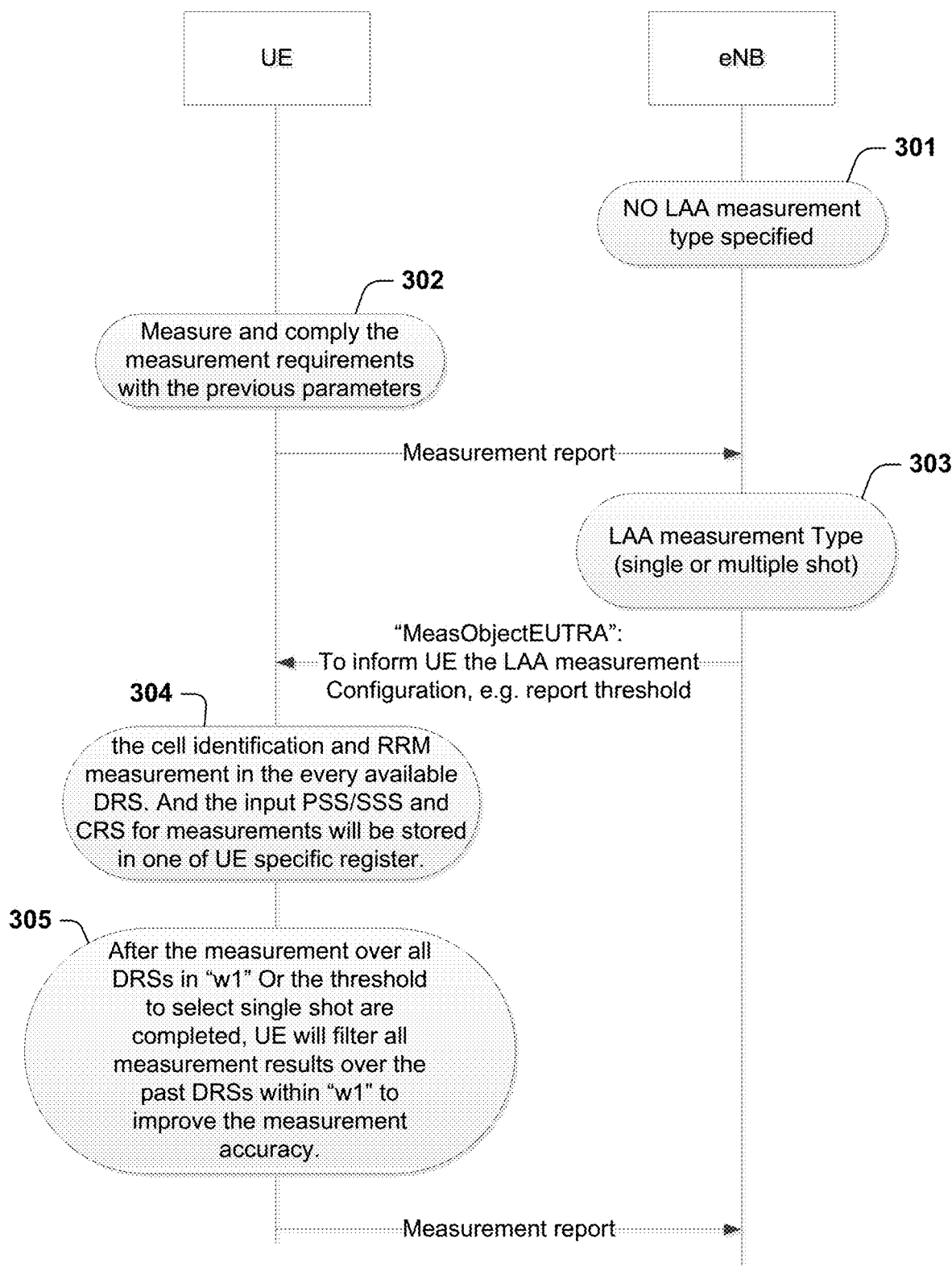
FIG. 3 is a diagram illustrating an example of using communications for a multi-shot window in accordance with an embodiment.

FIG. 3 is a diagram illustrating an example of using communications 300 for a multi-shot window in accordance with an embodiment. The example is provided to facilitate understanding and it is appreciated that suitable variations are contemplated.

The communications 300 are between an eNodeB and a UE, such as the eNodeB 110 and the UE 102, described above.

The communications 300 assume a request or use of an unlicensed channel or band, such as an ISM band. The eNodeB determines or has determined that the unlicensed band is idle or available. The eNodeB communicates a measurement type within a measurement configuration 301. In this example, the measurement type is that no measurement type or LAA measurement type is specified. Thus, it is up to the UE to determine the measurement type, multi-shot or single shot.

The UE uses one or more DRS to obtain target cell measurements at 302. The measurements are compared with previous parameters and/or threshold values. The UE generates a measurement report, which is provided to the eNodeB.

The eNodeB generates another measurement configuration at 303. Here, an LAA measurement type is specified as single or multi-shot. Other information can be included, such as a report threshold, cell identification and the like.

The UE performs cell identification and generates RRM or target cell measurements for available DRS at 304. The signals included with the DRS, including PSS and SSS can be used to generate the measurements and are generally stored in a UE specific register.

The UE filters or combines measurement results for a measurement window, such as w1, to improve measurement accuracy at 305. The measurement results are provided within a measurement report. The measurement report can include other information, such as the DRS used, threshold value, number of measurements and the like. A combined or overall target cell measurement is provided with the measurement report.

In one example, the UE generates the measurement report on the measurement window expiring. In another example, the UE generates the measurement report upon obtaining a suitable target cell measurement that exceeds the threshold value.

Figure 4:
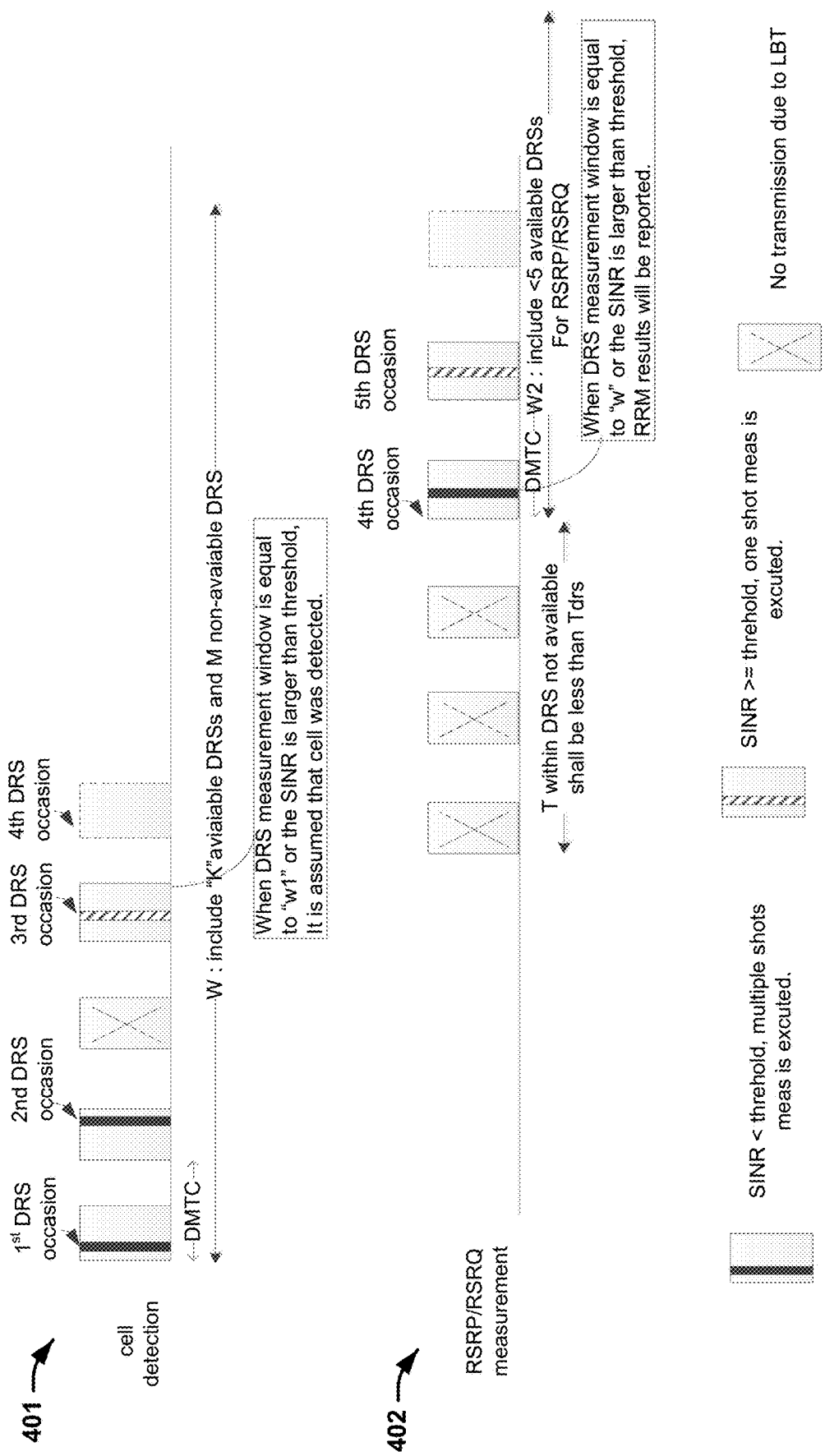
FIG. 4 is a diagram illustrating another example of obtaining a target cell measurement in accordance with an embodiment.

FIG. 4 is a diagram 400 illustrating another example of obtaining a target cell measurement in accordance with an embodiment. The example is provided to facilitate understanding and it is appreciated that suitable variations are contemplated. The diagram generally depicts time along an x-axis and values along a y-axis.

Cell detection 401 is shown for a first portion and target cell measurements 402 are shown in a second portion.

In the cell detection portion 401, a measurement window of W is shown that includes K available DRS and M non available DRS. The M non available can include occasions where there is no transmission due to LBT.

In the target cell measurement portion 402, a measurement window of W2 is shown. Here, DRS is not available for the first 3 occasions. In a fourth occasion, a measurement is obtained from the DRS, but it is below a threshold value. At a fifth occasion, another measurement is obtained and it is above the threshold value. The measurement is provided along with the RRM.

The DRS are generated by an eNodeB, such as the eNodeB 110, and received by a UE, such as the UE 102. Each DRS occurs at an occasion. The length of the measurement window is specified within a DMCT.

For each DRS occasion, the UE is configured to generate a target cell measurement based on the respective DRS, which in this example is a RSRP/RSRQ, where the RSRP is a reference signal received power and RSRQ is a reference signal received quality. It is appreciated that other metrics/measurements can also be used.

Figure 5:
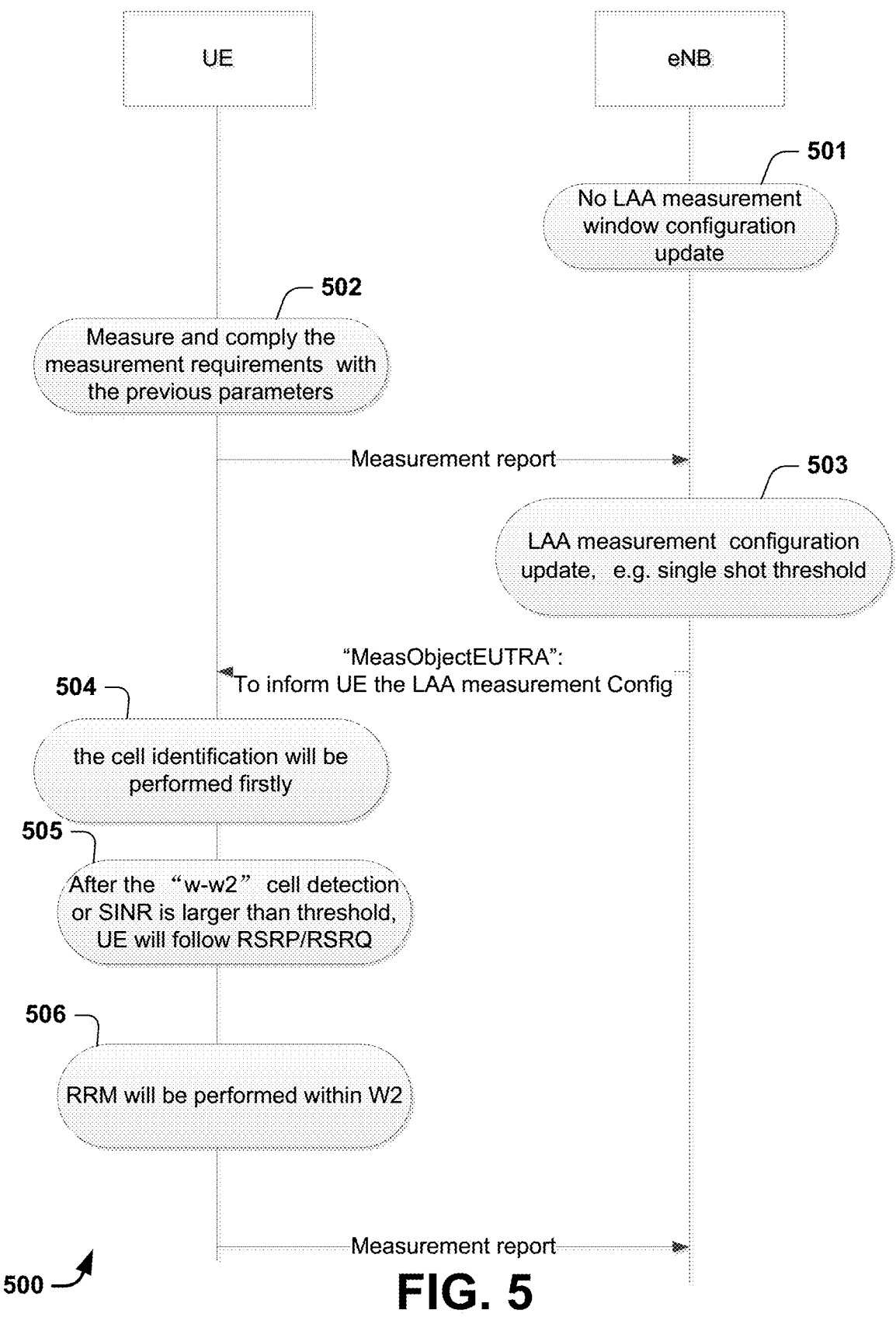
FIG. 5 is a diagram illustrating an example of using communications for a measurement window in accordance with an embodiment.

FIG. 5 is a diagram illustrating an example of using communications 500 for a measurement window in accordance with an embodiment. The example is provided to facilitate understanding and it is appreciated that suitable variations are contemplated.

The communications 500 are between an eNodeB and a UE, such as the eNodeB 110 and the UE 102, described above.

The communications 500 assume a request or use of an unlicensed channel or band, such as an ISM band. The eNodeB determines or has determined that the unlicensed band is idle or available. The eNodeB communicates a measurement type within a measurement configuration 501. In this example, the measurement configuration is that there is no update and a prior configuration can be used.

The UE uses one or more DRS to obtain target cell measurements at 502 in compliance with the previous parameters. The measurements are compared with previous parameters and/or threshold values. The UE generates a measurement report, which is provided to the eNodeB.

The eNodeB generates another measurement configuration at 503. Here, the prior measurement configuration is updated. Here, the configuration includes that a measurement type is single shot. Other information can be included, such as a report threshold, cell identification and the like.

The UE first performs cell identification at 504 within a window "w". After a period of time w-w2, the UE follows RSRP/RSRQ at 505 upon cell detection or an SINR larger than a threshold.

An RRM is performed within the w2 at 506 and a measurement report is generated by the UE and received by the eNodeB.

Referring again to FIG. 1, the UE 102 is configured to generate and provide a measurement report to the eNodeB regarding a target cell. The measurement report includes measurement type, cell identification and the like. The measurement report also includes a target cell measurement that indicates usability of the target cell, such as noise measurements and the like. An example technique shown above of the target cell measurement is the SINR.

However, some measurement techniques may not be feasible in some situations. For example, in LAA, physical downlink shared channel (PDSCH) SINR estimation may not be possible. However, a reference signal-signal to noise and interference ratio (RS-SINR) can be served as a SINR threshold to determine varied UE reporting behavior in LAA. Alternatively, the RS-SINR can cause a UE to execute accurate SINR detection if a cell identification is not verified by the UE.

In one example, cell specific reference signals $R_0$ are used to generate the RS-SINR. If available, cell specific reference signals $R_1$ can be additionally used to determine the RS-SINR.

Reference signal-signal to noise and interference ratio (RS-SINR), is defined as the linear average over the power contribution of the resource elements carrying cell-specific reference signals divided by the linear average of the noise and interference power contribution over the resource elements carrying cell-specific reference signals within the considered measurement frequency bandwidth.

The reference point for the RS-SINR is the antenna connector of the UE.

If receiver diversity is in use by the UE, the reported value shall not be lower than the corresponding RS-SINR of any of the individual diversity branches.

Generally the SINR per subcarrier is:

$$SINR = \frac{S}{I+N} \tag{1}$$

Where S is, I is interference, and N is. In orthogonal frequency division multiplexing (OFDM), own cell interference is assumed to be negligible and consequently I is due to other cell interference only.

And regarding RS-SINR is defined as:

$$RS-SINR = \frac{RSRP}{I_{CRS} + N_{CRS}} \tag{2}$$

Where $I_{CRS}$ and $N_{CRS}$ are the interference and noise in cell specific reference signal (CRS) resource elements (REs).

When the data REs are distributed in all REs (e.g. full loading),

Therefore, SINR can be similar as RS-SINR.

In order to correctly report UE measurement results in LAA with one-shot or multiple-shot types, the RS-SINR estimation with the residual timing and frequency offset is evaluated.

Thus, the RS-SINR can be evaluated under some timing and frequency offset. Since the RSRQ measurement in LAA may be impacted with asynchronous error, the result of SINR estimation depending on RSRQ could not be guaranteed.

Figure 6:
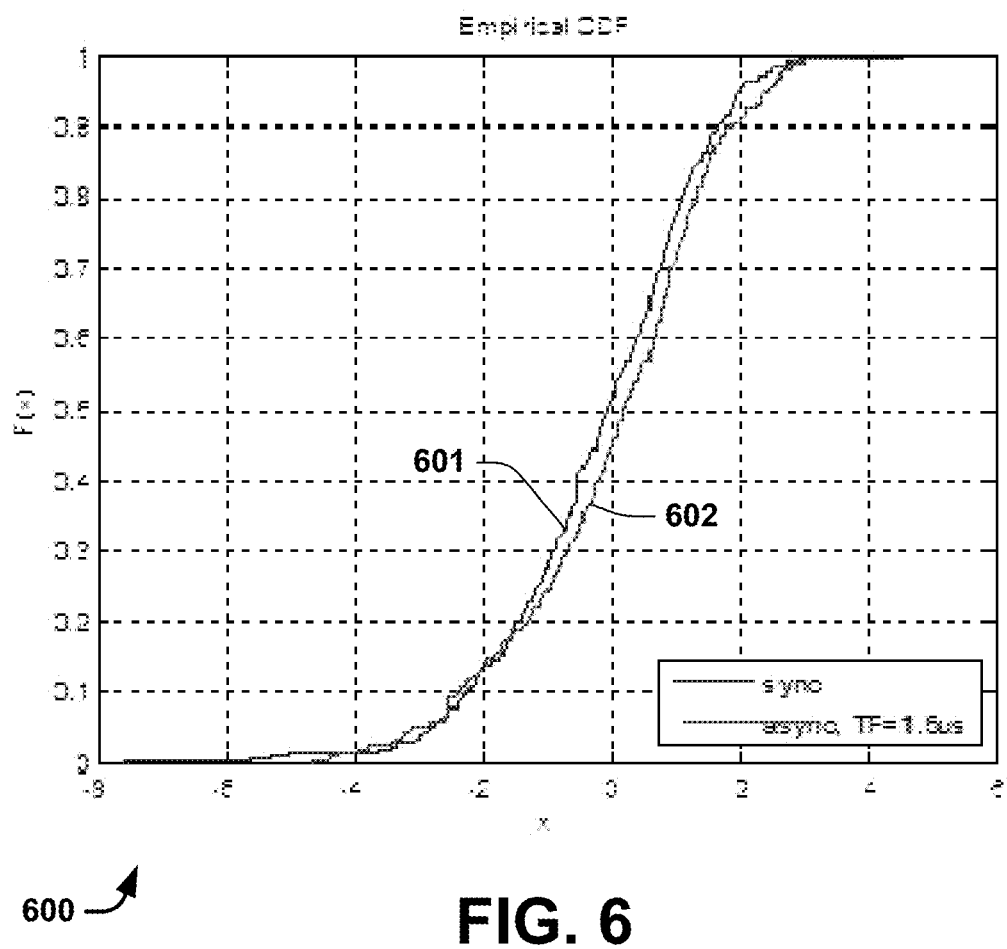
FIG. 6 is a graph showing SINR measurements for synchronous and asynchronous conditions based on CRS.

FIG. 6 is a graph 600 showing SINR measurements for synchronous and asynchronous conditions based on CRS.

An x-axis depicts the error between the estimated RSRQ and the ideal RSRQ and the y-axis depicts distribution probability (CDF). Line 601 illustrates the relationship between the error and the distribution probability for synchronous conditions. Line 602 illustrates the relationship between the error and the distribution probability of asynchronous conditions.

When the SINR is larger than −3 dB, the RSRQ measurement accuracy is suitable. Thus, RSRQ measurements with greater than 90 percent accuracy can be achieved for multi-shot and single shot types.

SINR estimation based on RSRQ is feasible where SINR is used for UE single-shot and multiple-shot measurement selection in LAA.

After we evaluate the feasibility of both one-shot and multiple-shot SINR side condition of LAA, the ambiguity of UE reporting can be avoided. For example, the RRM results can be reported to eNodeB by:

When the estimated SINR is larger than −1 dB, the UE will report the RRM measurement results in the current DRS subframe.

If the estimated SINR is up to the threshold (e.g., [−1 dB]) and the measured DRSs number is less than the configured window e.g. "w1" which is excluded the non-available DRS occasion, the UE stores the available PSS/SSS detection and RRM measurement results only.

Otherwise, UE will report its measurement result when "w1" DRS measurements are fulfilled.

A second example is shown below where SINR is calculated using measured RSRQ. One of the alternatives is with the RSRQ measured in the same DRS.

Generally the SINR per subcarrier is:

$$SINR = \frac{S}{I+N} = \frac{RSRP}{I+N} \qquad (3)$$

In OFDM own cell interference is often assumed to be negligible and consequently/is due to other cell interference only.

And regarding RSRQ $$RSRQ = N_{PRB}\frac{RSRP}{RSSI} \qquad (4)$$

Where $N_{PRB}$ is measurement bandwidth with RBs.
And RSSI could be:

$$RSSI = S_{tot} + I_{tot} + N_{tot} \qquad (5)$$

The subscript 'tot' here indicates the power is measured over all subcarriers in $N_{PRB}$ RBs.

$$S_{tot} = \lambda \cdot 12 \cdot N_{PRB} \cdot RSRP \qquad (6)$$

Where λ is the per-antenna subcarrier activity factor.

$$\lambda = \frac{N_{RE\_CRSData}}{N_{RE\_CRS}} \qquad (7)$$

Therefore, SINR can be calculated by:

$$SINR = \frac{S}{I+N} = \frac{RSRP}{\frac{RSSI - S_{tot}}{12 \cdot N_{PRB}}}$$

$$= \frac{12 \cdot N_{PRB} \cdot RSRP}{N_{PRB}\frac{RSRP}{RSRQ} - \lambda \cdot 12 \cdot N_{PRB} \cdot RSRP}$$

$$= \frac{1}{\frac{1}{12 \cdot RSRQ} - \lambda} \qquad (8)$$

$$SINR\_dB = 10 * \log\left(\frac{1}{\frac{1}{x * 12 * 10^{RSRQ\_dB/10}} - 1}\right) \qquad (9)$$

Theoretically the SINR can be derived from RSRQ as given in Eq (8). But it shall be noted that such SINR estimation method could be feasible assuming:

The RSRQ measurement accuracy with single cell identification in a same DRS is high enough and suitable. However, one concern of such estimation is the RSRQ measurement accuracy. The RSRQ measurement in LAA can be impacted by asynchronous error, thus, the result of SINR estimation depending on RSRQ could not be guaranteed.

Figure 7:
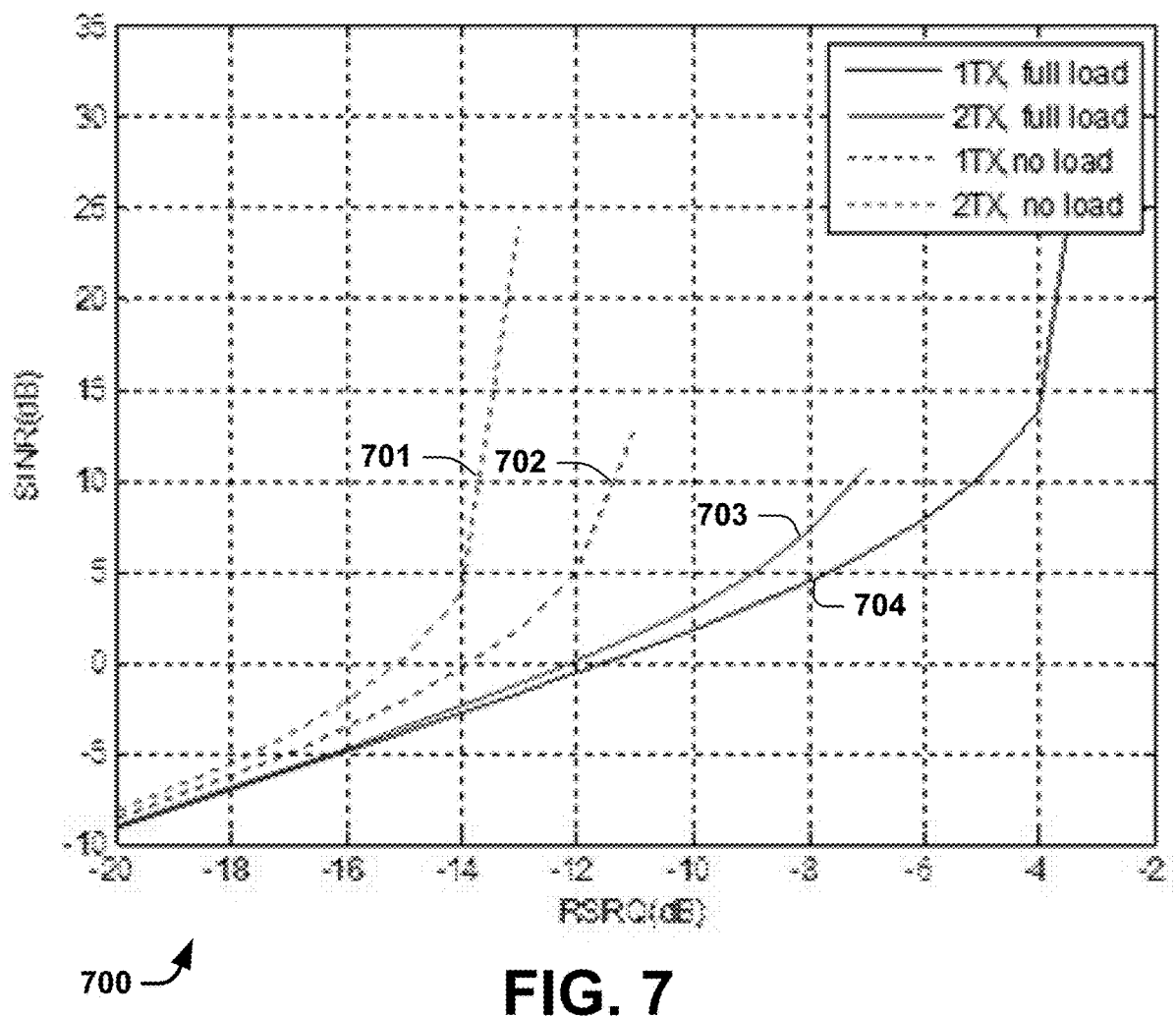
FIG. 7 is a graph showing SINR measurements for loaded and unloaded conditions.

FIG. 7 is a graph 700 showing SINR estimation by RSRQ for loaded and unloaded conditions.

An x-axis depicts RSRQ in decibels (dB) and a y-axis illustrates estimated SINR in dB. Line 701 depicts 2 transmitters (TX) under no load conditions, line 702 depicts 2 TX under no load conditions, line 703 depicts 2 TX under full load conditions and line 704 depicts 1 TX under full load conditions.

The mapping curve or lines in FIG. 7 show that when SINR is larger than −3 dB, the RSRQ measurement accuracy is good enough or suitable. Thus, the SINR threshold for multiple-shots and single-shot, the RSRQ measurement can be achieved with, in this example, at least 90% accuracy.

Figure 8:
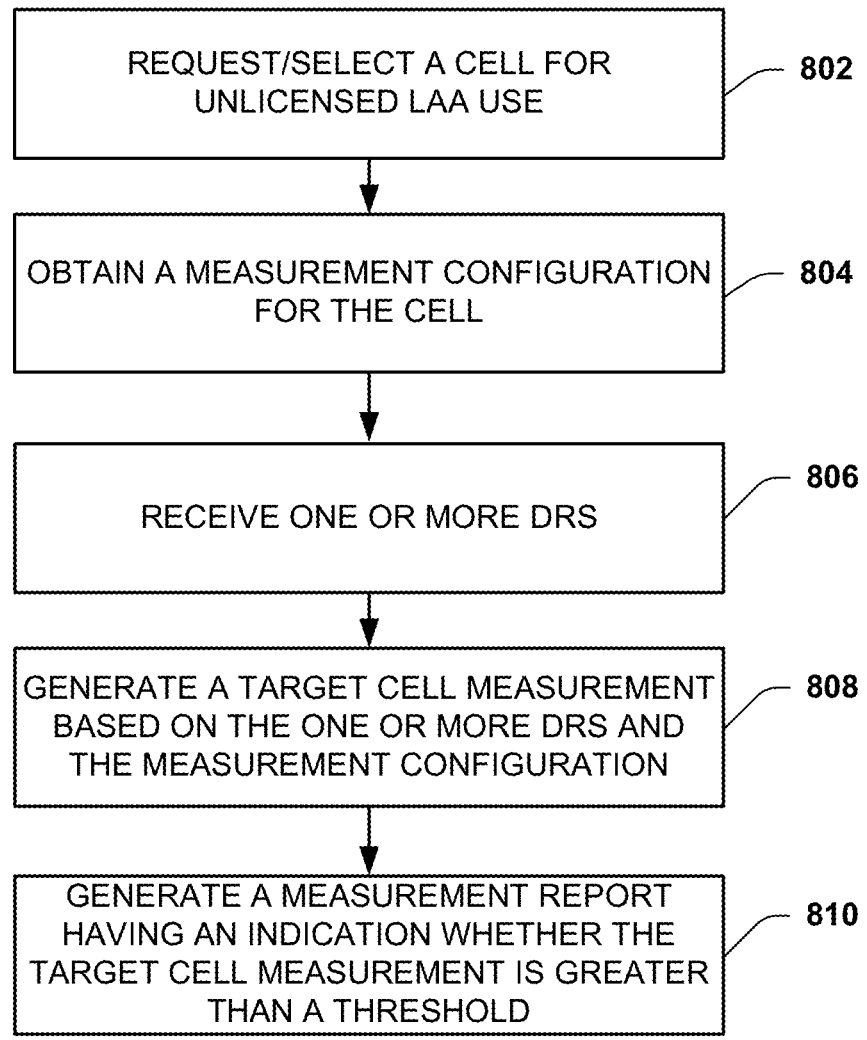
FIG. 8 is a flow diagram illustrating a method of performing communications using unlicensed bands with LAA.

FIG. 8 is a flow diagram illustrating a method 800 of performing communications using unlicensed bands with LAA. The method 800 determines target cell measurement(s) for a cell within an unlicensed band.

A user equipment (UE) requests and/or targets a cell for communications in an unlicensed band at block 802. The unlicensed band can include an ISM band, a band used for Wi-Fi™, and the like. The target cell is selected for use with license assisted access (LAA).

The UE obtains a measurement configuration for the target cell at block 804. The measurement configuration includes measurement type, a measurement window, cell identification, threshold value and the like. In one example, an evolved Node B (eNodeB) provides at least a portion of the measurement configuration. In another example, the eNodeB indicates that the UE can select a measurement type. Other variations and examples are provided above.

The UE receives one or more DRS during the measurement window at block 806. The eNodeB generates the one or more DRS at periodic times, referred to as occurrences. The time period is the DRS measurement timing configuration (DMTC) and specified within the measurement configuration. A portion of the DRS may not be available due to LBT performed by the eNodeB. The one or more DRS can include primary synchronization signals (PSS), secondary synchronization signals (SSS) and the like.

The UE generates a target cell measurement at block 808 based on the one or more DRS and the measurement configuration. The target cell measurement can be based on one of the one or more DRS, referred to as a single shot measurement type or based on a plurality of the one or more DRS, referred to as a multi-shot measurement type.

The target cell measurement can be based on SINR, RS-SINR and the like as shown above.

The UE generates a measurement report at block 810 based on the target cell measurement. The measurement report can include the target cell measurement and an indication that the target cell measurement is greater than a threshold value. In another example, the measurement reports that the target cell measurement did not exceed the threshold value, indicating that the target cell should not be used for communication. In yet another example, the measurement report indicates that measurements were not available. The measurement report can also include the target cell identification, threshold value used, and the like.

It is appreciated that the method 800 can be repeated for additional LAA cell requests and/or with addition eNodeBs.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 9:
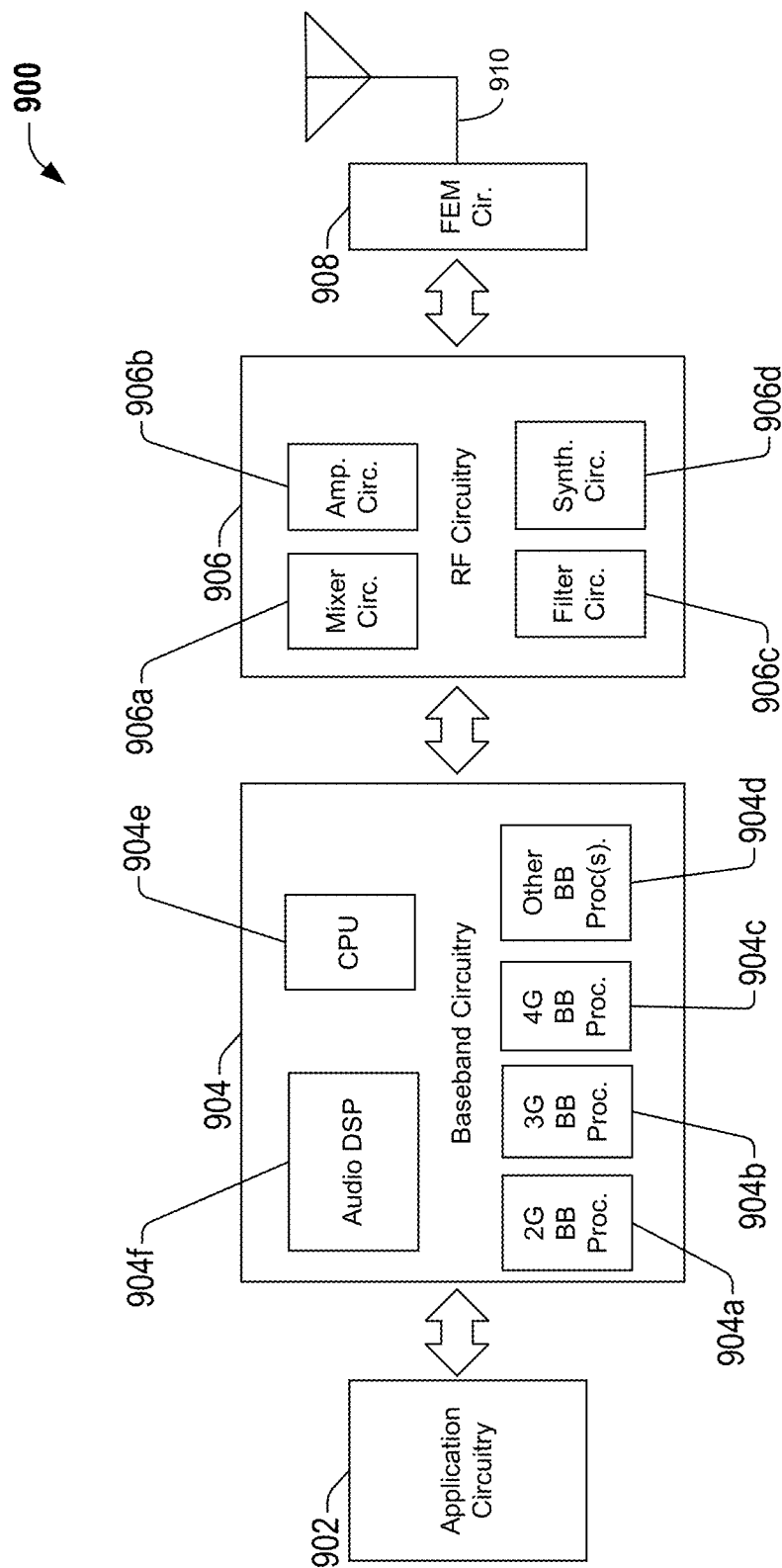
FIG. 9 illustrates example components of a User Equipment (UE) device.

Embodiments described herein can be implemented into a system using any suitably configured hardware and/or software. FIG. 9 illustrates, for one embodiment, example components of a User Equipment (UE) device 900. In some embodiments, the UE device 900 (e.g., the wireless communication device) can include application circuitry 902, baseband circuitry 904, Radio Frequency (RF) circuitry 906, front-end module (FEM) circuitry 908 and one or more antennas 910, coupled together at least as shown.

The application circuitry 902 can include one or more application processors. For example, the application circuitry 902 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The baseband circuitry 904 can include circuitry such as, but not limited to, one or more single-core or multi-core processors. The baseband circuitry 904 can include one or more baseband processors and/or control logic to process baseband signals received from a receive signal path of the RF circuitry 906 and to generate baseband signals for a transmit signal path of the RF circuitry 906. Baseband processing circuitry 904 can interface with the application circuitry 902 for generation and processing of the baseband signals and for controlling operations of the RF circuitry 906. For example, in some embodiments, the baseband circuitry 904 can include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 6G, etc.). The baseband circuitry 904 (e.g., one or more of baseband processors 904a-d) can handle various radio control functions that enable communication with one or more radio networks via the RF circuitry 906. The radio control functions can include, but are not limited to, signal modulation/demodulation, encoding/decoding, radio frequency shifting, etc. In some embodiments, modulation/demodulation circuitry of the baseband circuitry 904 can include Fast-Fourier Transform (FFT), precoding, and/or constellation mapping/demapping functionality. In some embodiments, encoding/decoding circuitry of the baseband circuitry 904 can include convolution, tail-biting convolution, turbo, Viterbi, and/or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 904 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 904e of the baseband circuitry 904 can be configured to run elements of the protocol stack for signaling of the PHY, MAC, RLC, PDCP and/or RRC layers. In some embodiments, the baseband circuitry can include one or more audio digital signal processor(s) (DSP) 904f. The audio DSP(s) 904f can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 904 and the application circuitry 902 can be implemented together such as, for example, on a system on a chip (SOC).

In some embodiments, the baseband circuitry 904 can provide for communication compatible with one or more radio technologies. For example, in some embodiments, the baseband circuitry 904 can support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 904 is configured to support radio communications of more than one wireless protocol can be referred to as multi-mode baseband circuitry.

RF circuitry 906 can enable communication with wireless networks using modulated electromagnetic radiation through a non-solid medium. In various embodiments, the RF circuitry 906 can include switches, filters, amplifiers, etc. to facilitate the communication with the wireless network. RF circuitry 906 can include a receive signal path which can include circuitry to down-convert RF signals received from the FEM circuitry 908 and provide baseband signals to the baseband circuitry 904. RF circuitry 906 can also include a transmit signal path which can include circuitry to up-convert baseband signals provided by the baseband circuitry 904 and provide RF output signals to the FEM circuitry 908 for transmission.

In some embodiments, the RF circuitry 906 can include a receive signal path and a transmit signal path. The receive signal path of the RF circuitry 906 can include mixer circuitry 906a, amplifier circuitry 906b and filter circuitry 906c. The transmit signal path of the RF circuitry 906 can include filter circuitry 906c and mixer circuitry 906a. RF circuitry 906 can also include synthesizer circuitry 906d for synthesizing a frequency for use by the mixer circuitry 906a of the receive signal path and the transmit signal path. In some embodiments, the mixer circuitry 906a of the receive signal path can be configured to down-convert RF signals received from the FEM circuitry 908 based on the synthesized frequency provided by synthesizer circuitry 906d. The amplifier circuitry 906b can be configured to amplify the down-converted signals and the filter circuitry 906c can be a low-pass filter (LPF) or band-pass filter (BPF) configured to remove unwanted signals from the down-converted signals to generate output baseband signals. Output baseband signals can be provided to the baseband circuitry 904 for further processing. In some embodiments, the output baseband signals can be zero-frequency baseband signals, although this is not a requirement. In some embodiments, mixer circuitry 906a of the receive signal path can comprise passive mixers, although the scope of the embodiments is not limited in this respect.

In some embodiments, the mixer circuitry 906a of the transmit signal path can be configured to up-convert input baseband signals based on the synthesized frequency provided by the synthesizer circuitry 906d to generate RF output signals for the FEM circuitry 908. The baseband signals can be provided by the baseband circuitry 904 and can be filtered by filter circuitry 906c. The filter circuitry 906c can include a low-pass filter (LPF), although the scope of the embodiments is not limited in this respect.

In some embodiments, the mixer circuitry 906a of the receive signal path and the mixer circuitry 906a of the transmit signal path can include two or more mixers and can be arranged for quadrature downconversion and/or upconversion respectively. In some embodiments, the mixer circuitry 906a of the receive signal path and the mixer circuitry 906a of the transmit signal path can include two or more mixers and can be arranged for image rejection (e.g., Hartley image rejection). In some embodiments, the mixer circuitry 906a of the receive signal path and the mixer circuitry 906a can be arranged for direct downconversion and/or direct upconversion, respectively. In some embodiments, the mixer circuitry 906a of the receive signal path and the mixer circuitry 906a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 906 can include analog-to-digital converter (ADC) and digital-to-analog converter (DAC) circuitry and the baseband circuitry 904 can include a digital baseband interface to communicate with the RF circuitry 906.

In some dual-mode embodiments, a separate radio IC circuitry can be provided for processing signals for each spectrum, although the scope of the embodiments is not limited in this respect.

In some embodiments, the synthesizer circuitry 906d can be a fractional-N synthesizer or a fractional N/N+8 synthesizer, although the scope of the embodiments is not limited in this respect as other types of frequency synthesizers can be suitable. For example, synthesizer circuitry 906d can be a delta-sigma synthesizer, a frequency multiplier, or a synthesizer comprising a phase-locked loop with a frequency divider.

The synthesizer circuitry 906d can be configured to synthesize an output frequency for use by the mixer circuitry 906a of the RF circuitry 906 based on a frequency input and a divider control input. In some embodiments, the synthesizer circuitry 906d can be a fractional N/N+8 synthesizer.

In some embodiments, frequency input can be provided by a voltage controlled oscillator (VCO), although that is not a requirement. Divider control input can be provided by either the baseband circuitry 904 or the applications processor 902 depending on the desired output frequency. In some embodiments, a divider control input (e.g., N) can be determined from a look-up table based on a channel indicated by the applications processor 902.

Synthesizer circuitry 906d of the RF circuitry 906 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+8 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency ($f_{LO}$). In some embodiments, the RF circuitry 906 can include an IQ/polar converter.

FEM circuitry 908 can include a receive signal path which can include circuitry configured to operate on RF signals received from one or more antennas 980, amplify the received signals and provide the amplified versions of the received signals to the RF circuitry 906 for further processing. FEM circuitry 908 can also include a transmit signal path which can include circuitry configured to amplify signals for transmission provided by the RF circuitry 906 for transmission by one or more of the one or more antennas 980.

In some embodiments, the FEM circuitry 908 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 906). The transmit signal path of the FEM circuitry 908 can include a power amplifier (PA) to amplify input RF signals (e.g., provided by RF circuitry 906), and one or more filters to generate RF signals for subsequent transmission (e.g., by one or more of the one or more antennas 980.

In some embodiments, the UE device 900 can include additional elements such as, for example, memory/storage, display, camera, sensor, and/or input/output (I/O) interface.

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is an arrangement configured to be employed within a user equipment (UE). The arrangement includes control circuitry. The control circuitry is configured to obtain a measurement configuration, where the measurement configuration complies with license assisted access (LAA) and includes a measurement window; obtain one or more discovery reference signals (DRS) from an evolved Node B (eNodeB) during the measurement window; generate a target cell measurement based on the one or more DRS and the measurement configuration; and generate a measurement report that includes the target cell measurement.

Example 2 includes the subject matter of Example 1, including or omitting optional elements, where the measurement configuration includes a measurement type pre-configured by the eNodeB.

Example 3 includes the subject matter of any of Examples 1-2, including or omitting optional elements, where the measurement configuration includes a measurement type pre-configured by the UE.

Example 4 includes the subject matter of any of Examples 1-3, including or omitting optional elements, where the measurement window includes a plurality of DRS.

Example 5 includes the subject matter of any of Examples 1-4, including or omitting optional elements, where at least one of the one or more DRS is not available as a result of a listen before talk (LBT) operation performed by the eNodeB.

Example 6 includes the subject matter of any of Examples 1-5, including or omitting optional elements, where the control circuitry is further configured to perform cell detection based on the one or more DRS.

Example 7 includes the subject matter of any of Examples 1-6, including or omitting optional elements, where the control circuitry is configured to perform cell detection using the same DRS used for the target cell measurement.

Example 8 includes the subject matter of any of Examples 1-7, including or omitting optional elements, where the target cell measurement is based on a plurality of DRS measurements.

Example 9 includes the subject matter of any of Examples 1-8, including or omitting optional elements, where the target cell measurement includes an SINR estimated larger than a threshold amount, wherein the threshold amount is specified within the measurement configuration.

Example 10 includes the subject matter of any of Examples 1-9, including or omitting optional elements, where the measurement configuration includes a measurement type as single shot, wherein only one DRS of the one or more DRS is used to generate the target cell measurement.

Example 11 includes the subject matter of any of Examples 1-10, including or omitting optional elements, where the measurement configuration includes a measurement type as multi-shot, wherein a plurality of DRS of the one or more DRS is used to generate the target cell measurement.

Example 12 includes the subject matter of any of Examples 1-11, including or omitting optional elements, where the control circuitry is configured to dynamically determine the measurement type between multi-shot and single shot based on one or more SINR estimates based on the one or more DRS signals.

Example 13 includes the subject matter of any of Examples 1-12, including or omitting optional elements, where the DRS include primary synchronization signals (PSS) and secondary synchronization signals (SSS).

Example 14 includes the subject matter of any of Examples 1-13, including or omitting optional elements, where the target cell measurement is based on reference signal-signal to noise and interference ratio (RS-SINR) measured by a cell specific reference signal (CRS) in the same DRS in LAA.

Example 15 includes the subject matter of any of Examples 1-14, including or omitting optional elements, where the target cell measurement is based on primary synchronization signals (PSS) and secondary synchronization signals (SSS) of a single DRS of the one or more DRS.

Example 16 is an arrangement configured to be employed within an evolved Node B (eNodeB). The arrangement includes control circuitry. The control circuitry is configured to generate a measurement configuration having a measurement type, measurement window, cell identification of a target cell and a DRS measurement timing configuration (DMTC), where the measurement configuration complies with license assisted access (LAA). The control circuitry is also configured to generate one or more discovery reference signals (DRS) during the measurement window. Additionally, the control circuitry is configured to receive a measurement report having a target cell measurement for the target cell.

Example 17 includes the subject matter of Example 16, including or omitting optional elements, where the measurement type is one of single shot and multi-shot, where the single shot specifies that the target cell measurement is based on a single DRS of the one or more DRS and the multi-shot specifies that the target cell measurement is based on a plurality of DRS of the one or more DRS.

Example 18 includes the subject matter of any of Examples 16-17, including or omitting optional elements, where the one or more DRS include primary synchronization signals (PSS) and secondary synchronization signals (SSS).

Example 19 includes the subject matter of any of Examples 16-18, including or omitting optional elements, where the measurement configuration includes a target cell threshold and the target cell measurement is greater than the target cell threshold.

Example 20 includes one or more computer-readable media having instructions that when executed causes one or more user equipment (UEs) to obtain a measurement configuration for a cell request using license assisted access (LAA), wherein the measurement configuration includes a measurement window, cell identification and a measurement type; receive one or more discovery reference signals (DRS) from an evolved Node B (eNodeB) within the measurement window; and generate a target cell measurement based on the one or more DRS.

Example 21 includes the one or more computer-readable media of Example 20, including or omitting optional elements, wherein the media has instructions that when executed further causes the one or more user equipment (UEs) to generate a measurement report having an indication whether the target cell measurement is greater than a threshold amount, wherein the threshold amount is specified in the measurement configuration.

Example 22 includes the one or more computer-readable media of any of Examples 20-21, including or omitting optional elements, where the measurement type is one of single shot and multi-shot, where the single shot specifies that the target cell measurement is based on a single DRS of the one or more DRS and the multi-shot specifies that the target cell measurement is based on a plurality of DRS of the one or more DRS.

Example 23 is an apparatus configured to be employed within an evolved Node B (eNodeB). The apparatus includes a means for obtaining a measurement configuration for a cell request using license assisted access (LAA), wherein the measurement configuration includes a measurement window, cell identification and a measurement type; a means for receiving one or more discovery reference signals (DRS) from an evolved Node B (eNodeB) within the measurement window; and a means for generating a target cell measurement based on the one or more DRS.

Example 24 includes the subject matter of Example 24, including or omitting optional elements, further comprising means for generating a measurement report having an indication whether the target cell measurement is greater than a threshold amount.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An arrangement configured to be employed within a user equipment (UE), the arrangement comprising:
control circuitry to:
obtain a measurement configuration, where the measurement configuration complies with license assisted access (LAA) and includes a measurement window;
obtain one or more discovery reference signals (DRS) during the measurement window;
generate a target cell measurement based on the one or more DRS and the measurement configuration;
dynamically determine whether to use a single shot or a multi-shot based on the target cell measurement to request communication use of an unlicensed band; and
generate a measurement report that includes the target cell measurement.

2. The arrangement of claim 1, wherein the measurement configuration includes a measurement type pre-configured by an eNodeB.

3. The arrangement of claim 1, wherein the measurement configuration includes a measurement type pre-configured by the UE.

4. The arrangement of claim 1, wherein the measurement window includes a plurality of DRS.

5. The arrangement of claim 1, wherein at least one of the one or more DRS is not available as a result of a listen before talk (LBT) operation performed by an eNodeB.

6. The arrangement of claim 1, wherein the control circuitry is further configured to perform cell detection based on the one or more DRS.

7. The arrangement of claim 1, wherein the control circuitry is configured to perform cell detection using the same DRS used for the target cell measurement.

8. The arrangement of claim 1, wherein the target cell measurement is based on a plurality of DRS measurements.

9. The arrangement of claim 1, wherein the target cell measurement includes a signal to intereference plus noise ratio (SINR) estimated larger than a threshold amount, wherein the threshold amount is specified within the measurement configuration.

10. The arrangement of claim 1, wherein the single shot comprises only one DRS of the one or more DRS used to generate the target cell measurement.

11. The arrangement of claim 1, wherein the multi-shot comprises a plurality of DRS of the one or more DRS used to generate the target cell measurement.

12. The arrangement of claim 1, wherein the control circuitry is to dynamically determine the measurement type between the multi-shot and the single shot based on one or more SINR estimates based on the one or more DRS.

13. The arrangement of claim 1, wherein the DRS include primary synchronization signals (PSS) and secondary synchronization signals (SSS).

14. The arrangement of claim 1, wherein the target cell measurement is based on reference signal-signal to noise and interference ratio (RS-SINR) measured by a cell specific reference signal (CRS) in the same DRS in LAA.

15. The arrangement of claim 1, wherein the target cell measurement is based on primary synchronization signals (PSS) and secondary synchronization signals (SSS) of a single DRS of the one or more DRS.

16. An arrangement configured to be employed within an evolved Node B (eNodeB), the arrangement comprising:
control circuitry to:
generate a measurement configuration having a measurement type, measurement window, cell identification of a target cell and a DRS measurement timing configuration (DMTC), where the measurement configuration complies with license assisted access (LAA);
generate one or more discovery reference signals (DRS) during the measurement window;
enable a dynamic determination of whether to use a single shot or a multi-shot to request communication use of an unlicensed band; and
receive a measurement report having a target cell measurement for the target cell.

17. The arrangement of claim 16, where the single shot specifies that the target cell measurement is based on a single DRS of the one or more DRS and the multi-shot specifies that the target cell measurement is based on a plurality of DRS of the one or more DRS.

18. The arrangement of claim 16, wherein the one or more DRS include primary synchronization signals (PSS) and secondary synchronization signals (SSS).

19. The arrangement of claim 16, wherein the measurement configuration includes a target cell threshold and the target cell measurement is greater than the target cell threshold.

20. A non-transitory computer-readable media having instructions that, when executed, cause one or more user equipment (UEs) to:
   obtain a measurement configuration for a cell request using license assisted
   access (LAA), wherein the measurement configuration includes a measurement window, cell identification and a measurement type;
   receive one or more discovery reference signals (DRS) within the measurement window;
   dynamically determine whether to use a single shot or a multi-shot based on a target cell measurement to request communication use of an unlicensed band; and
   generate the target cell measurement based on the one or more DRS.

21. The non-transitory computer-readable media of claim 20, comprising one or more computer-readable media having instructions that, when executed, further cause the one or more user equipment (UEs) to:
   generate a measurement report having an indication whether the target cell measurement is greater than a threshold amount, wherein the threshold amount is specified in the measurement configuration.

22. The non-transitory computer-readable media of claim 20, where the single shot specifies that the target cell measurement is based on a single DRS of the one or more DRS and the multi-shot specifies that the target cell measurement is based on a plurality of DRS of the one or more DRS.

* * * * *